United States Patent [19]
Jüngling et al.

[11] Patent Number: 6,107,424
[45] Date of Patent: Aug. 22, 2000

[54] NITROGEN-CONTAINING METAL-FREE INITIATORS FOR ANIONIC POLYMERIZATION OF ACRYLATES

[75] Inventors: Stephan Jüngling, Mannheim, Germany; Thieo E. Hogen-Esch, South Pasadena; Dimo Dimov, Los Angeles, both of Calif.; Axel H. E. Müller, Wiesbaden; Herbert Königsmann, Klein-Winternheim, both of Germany

[73] Assignee: BASF Aktiengesellschaft, Ludwigshafen, Germany

[21] Appl. No.: 09/135,406

[22] Filed: Aug. 18, 1998

[51] Int. Cl.$^7$ ........................................ C08F 30/02
[52] U.S. Cl. ..................... 526/278; 526/274; 526/276; 526/277
[58] Field of Search ................................... 526/274, 276, 526/277, 278

[56] References Cited

U.S. PATENT DOCUMENTS 5,045,632   9/1991   Parker ........................................ 562/45

OTHER PUBLICATIONS

Martin et al. "Group transfer initiated polymerization of methyl methacrylate catalyzed by [((C6H5)3P)2N] = HF2–" Makromol. Chem. 193, 1011–1019(1992).

*Primary Examiner*—Helen L. Pezzuto
*Attorney, Agent, or Firm*—Oblon, Spivak, McClelland, Maier & Neustadt, P.C.

[57]   ABSTRACT

A method for preparing a polymer, comprising the step of polymerizing a monomer of the formula

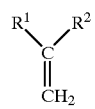

in the presence of a specific initiator containing at least one amino subotituent and one aromatic substituent on a phosphorus atom.

17 Claims, 1 Drawing Sheet

NITROGEN-CONTAINING METAL-FREE INITIATORS FOR ANIONIC POLYMERIZATION OF ACRYLATES

BACKGROUND OF THE INVENTION

1. Field of the Invention

The present invention concerns a novel method for preparing polymers (preferably (meth)acrylate polymers and copolymers) having a narrow molecular weight distribution by metal-free anionic polymerization in the presence of an organic cation containing at least one amino substituent and one aromatic substituent on a phosphorus atom.

2. Discussion of the Background

In the last decade, great interest has emerged concerning the polymerization of (meth)acrylates (i.e. methacrylates or acrylates), particularly methyl methacrylate (MMA), under ambient conditions. A number of new polymerization systems and processes have been reported, and a recent review covers most of the literature on the polymerization of MMA at ambient temperatures (T. P. Davies, D. M. T. Haddelton, S. N. Richards, J. M. S.-Rev. Macromol. Chem. Phys., 1994, C34, 243).

The polymerization of acrylic acid derivatives at temperatures of more than 20° C. and particulary between 40 and 120° C. in the presence of an initiator corresponding to or containing the structure I where E is $CR^{IV}R^V$, wherein the C together with $R^{IV}$ and $R^V$ forms an unsaturated carbocyclic ring was disclosed in DE-A 36 32 361 and DE-A 37 00 195. The initiator (I) can also be used in its protonated form. As shown in the examples, the best results are obtained when the initiator is employed as a Lewis acid adduct. Merely very poor yields, incomplete monomer conversion and polymers having a broad molecular weight distribution are obtained when the reaction is performed in the presence of the neutral catalyst. In the case of the protonated species the acidic proton may cause chain termination. Therefore, the versatility of the polymerization process using (I) is limited.

Another process for metal-free anionic polymerization of acrylates and methacrylates disclosed by Seebach and Pietzonka (Angew. Chem. Int. Ed. Engl. 1993, 32, 716) makes use of the P4-phosphazene base which forms a very soft and bulky cation. The initiating system can for example be prepared by treating ethyl acetate with the P4-phosphazene base. Polymerization of for example, methylmethacrylate is accomplished at 60° C. furnishing predominantly a syndiotactic polymer material. However, the P4-phosphazene base is not readily available and therefore not favorable for large scale production. In addition, the formation of block copolymers by this process has not been disclosed.

A distinct improvement over the methods described is achieved by the anionic polymerization in the presence of phosphonium counterions as for example $Ph_4P^+Ph_3C^-$, described in WO 96/28487 (U.S. patent application Ser. No. 08/609,732). According to WO 96/28487 the polymerization is carried out at temperatures up to 40° C. and leads to (meth)acrylate polymers and copolymers having a narrow molecular weight distribution in good yields. One disadvantage of this process is the sensitivity of the initiator, which decomposes within a few minutes at room temperature.

U.S. patent application Ser. No. 08/827,906, filed, which is included herein by reference, describes a method for preparing polymers by anionic polymerization in the presence of phosphonium cations containing hydrocarbon substituents, wherein at least one is an annelated aromatic ring, as substituents at the phosphorus atom. The polymerization is carried out at temperatures above 40° C., because of the high stability of the initiator.

Thus, a need exists for a method for producing (meth) acrylate polymers and copolymers having a narrow molecular weight distribution (so-called "monodisperse" polymers), which provides effective control of polymer molecular weight, of molecular weight distribution and of polymer stereoregularity, in good yields at ambient temperatures.

OBJECTS OF THE INVENTION

Accordingly, it is one object of the present invention to provide a novel method for producing (meth)acrylate polymers by anionic polymerization which provides a polymer having a narrow molecular weight distribution.

It is a further object of the present invention to provide a novel method for producing (meth)acrylate polymers by anionic polymerization which provides effective control of polymer molecular weight.

It is a further object of the present invention to provide a novel method for producing (meth)acrylate polymers by anionic polymerization which can provide effective control of polymer stereoregularity (e.g., isotacticity and/or syndiotacticity).

It is a further object of the present invention to provide a novel method for producing (meth)acrylate polymers by anionic polymerization which provides the polymer in good yields.

It is a further object of the present invention to provide a novel method for producing (meth)acrylate polymers which achieves the above objects at ambient temperatures.

It is a further object of the present invention to provide a novel method for producing (meth)acrylate copolymers by anionic polymerization using a novel initiator which is stable at ambient temperature for a time sufficient to conduct the polymerization reaction conveniently with reproducable results.

These and other objects, which will become apparent in the following detailed description of the preferred embodiments, are achieved by a method for producing a (meth)acrylate polymer, which comprises:

polymerizing a monomer of the formula:

in the presence of an initiator of the formula $$n[(Ar)_xP(NR^6R^7)_{4-x}]^+Q^{n-} \qquad (II)$$

and/or $$[(Ar)_xP(NR^6R^7)_{4-x}]^+(Q')^- \qquad (III)$$

at a temperature of from −78° C. to +60° C., in the presence or absence of solvent, for a length of time sufficient to polymerize the monomer(s), wherein:

$R^1$ is selected from the group consisting of H, CN, $CF_3$, alkyl of from 1 to 6 carbon atoms and aryl, and $R^2$ is selected from the group consisting of CN, C(=X)$R^3$, C(=X)$NR^4R^5$ and heterocyclic rings capable of stabilizing an α-anion, where X is NR (R is $C_1$-$C_{20}$ alkyl), O or S, $R^3$ is alkyl of from 1 to 20 carbon atoms, alkoxy of from 1 to 20 carbon atoms or alkylthio of from 1 to 20 carbon atoms, and $R^4$ and $R^5$ are independently alkyl of from 1 to 20 carbon atoms or are joined together to form an alkylene group of from 2 to 5 carbon atoms, thus forming a 3- to 6-membered ring;

$R^6$ and $R^7$ are either independently alkyl of from 1 to 20 carbon atoms, alkoxy from 1 to 20 carbon atoms or aryl or are joined together to form, together with the N-atom, a 3- to 6-membered N-heterocyclic ring, additionally $R^6$ and $R^7$ together may be =P(Ar)$_x$, Ar is aryl (as defined later on) and x is an integer from 1 to 3;

Q is $CR^8R^9R^{10}$, $NR^{11}R^{12}$, $OR^{13}$, $SR^{14}$ or $R^{15}(CR^8R^9)_p(NR^{11})_q(O)_r(S)_s$ wherein p, q, r and s are independently an integer of from 0 to 30 and where the sum of p to s is at least 2;

Q' is $R^{16}$—$CR^8R^9R^{10}$, $R^{16}$—$NR^{11}R^{12}$, $R^{16}$—$OR^{13}$, $R^{16}$—$SR^{14}$, $R^{16}$—Z;

$R^8$ and $R^9$—$CR^8R^{9R10}$, $R^{16}$—$NR^{11}R^{12}$, $R^{16}$—$OR^{13}$, $R^{16}$—$SR^{14}$, $R^{16}$—Z;

$R^8$ and $R^9$ are independently alkyl of from 1 to 20 carbon atoms, aryl, CN, C(=X)$R^3$ as defined above and C(=X)$NR^4R^5$ as defined above, and $R^8$ and $R^9$ may be joined together to form a ring, and $R^{10}$ is H, alkyl of from 1 to 20 carbon atoms, aryl or a polymer radical;

$R^{11}$ and $R^{12}$ are independently alkyl of from 1 to 20 carbon atoms, aryl, $C_7$- to $C_{20}$-aralkyl, $C_3$- to $C_{30}$-organosilyl, C(=X)$R^3$ as defined above, or $R^{11}$ and $R^{12}$ are joined together to form a heterocycle, $R^{13}$ and $R^{14}$ are independently alkyl of from 1 to 20 carbon atoms, cycloalkyl of from 3 to 10 carbon atoms or aryl, $R^{15}$ is an organic radical of value p+q+r+s;

$R^{16}$ is a polymer radical;

Z is a radical derived from an initiator for the anionic polymerization of anionic polymerizable monomers other than radicals derived from compounds II or III.

n is an integer of from 1 to 30.

Ar is aryl and refers to a single aromatic ring or a fused aromatic ring system with two nuclei;

quenching the reaction mixture with an acyl halide, an acid anhydride or a substance containing an active hydrogen atom, to form a polymer; and isolating the formed polymer.

DETAILED DESCRIPTION OF THE PREFERRED EMBODIMENTS

The present process can be used to make polymers from a wide variety of monomers.

In the context of the present invention, "polymers" refer to polymers or copolymers.

Vinyl monomers suitable for the present process should bear at least one electron-withdrawing and/or formally negative charge-stabilizing group, such as an ester group, a keto group, a sulfone group, a phosphonate group, a heterocyclic ring, a phenyl ring bearing one or more electron-withdrawing and/or formally negative charge-stabilizing substituents, etc. The initiator can be any stabilized carbanion, but preferably one in which the corresponding neutral carboxylic acid has a $pK_a$ of from 12 to 37, and more preferably, a $PK_a$ of from 18 to 35. The key to the present process involving the anionic, metal-free polymerization of a vinyl monomer lies in the use of an organic countercation containing at least one amino substituent and one aromatic substituent at a phosphorus atom.

During their work the present inventors have found out that the anionic polymerization of methylmethacrylate (MMA) in the presence of a hydrocarbon substituted phosphonium cation in different solvents at different temperatures using suitable anions like the triphenylmethyl anion ($Ph_3C^-$) as an initiator results in PMMA with a narrow MWD (≦1.1 at 0° C.) and good yields. However, this process suffers from the low thermal stability of the initiator.

The process of the present invention provides polymers, and particularly poly(meth)acrylates, having a relatively narrow molecular weight distribution, in substantially quantitative yields at ambient temperatures. Molecular weights of the polymers produced by the present process, which may be weight average or number average molecular weights, may be controlled by suitably selecting the molar ratio of initiator to monomer, and may range from 500 g/mol to 300,000 g/mol, preferably from 1,000 to 200,000 g/mol, and most preferably from 2,000 to 60,000 g/mol. At room temperature (25° C.), the polymers produced are relatively monodisperse (e.g., by using [($Ph_3P$)N($PPh_3$)]$^+$($CPh_3$)$^-$ a PMMA is produced, having a MW of 7,100 and an $M_W/M_n$ of about 1.22), at about 0° C., the polymers become more monodisperse (e.g., by using [N($PPh_3$)$_2$]$^+$ ($CPh_3$)$^-$ a PMMA is produced, having a MW of 7,300 and an $M_W/M_n$ of about 1.14). In the context of the present application, the term "monodisperse" refers to a polymer having a weight average molecular weight ($M_W$)/number average molecular weight ($M_n$) ratio of ≦2.0, preferably ≦1.5, and most preferably ≦1.2.

The polymerization step of the present method is relatively rapid, generally being completed within 10 minutes or less. In some cases, the polymerization step may be completed within 5 minutes or less, and in further cases, 1 minute or less. However, the more rapid the polymerization, the higher the heat of polymerization and the higher the reaction temperature. Monomer conversions typically are substantially complete (e.g. for the polymerization of MMA at least 90%, preferably at least 95% and most preferably at least 98% of the monomer are consumed during the polymerization reaction).

Because the present reacting step is a "living" polymerization, the process can be applied to prepare block and multi-block copolymers. The bulky organic cations are believed to prevent intramolecular cation coordination to the ante-penultimate ester carbonyl group.

Polymers produced according to the present process have a variety of uses. For example, PMMA is the polymer used to make PLEXIGLAS®. Furthermore, the polymers produced by the present method are sufficiently monodisperse as to provide PMMA or other polymer standards for size exclusion chromatography.

Monomers suitable for polymerization in the present method include those of the formula:

wherein R¹ and R² are as defined before.

Preferably said monomer is a (meth)acrylate ester of a $C_1$–$C_{20}$ alcohol, in particular of $C_1$–$C_{12}$ alcohol, such as methyl acrylate, n-butyl acrylate, t-butyl acrylate, ethyl acrylate, 2-ethylhexyl acrylate, methyl methacrylate, ethyl methacrylate or 2-ethylhexyl methacrylate, n-butyl methacrylate, t-butyl methacrylate, lauryl methacrylate, allyl methacrylate, dicyclopentadienyl methacrylate or acrylonitrile. Also preferred are cyanoacrylate esters of $C_1$–$C_{20}$ alcohols. Preferred monomers are also vinyl heterocycles having about 5 to 6 ring members and containing from 1 to 3 heteroatoms, selected from N, O, and S and including heterocyclic rings selected from the group consisting of 2-vinyl pyridine, 6-vinyl pyridine, 2-vinyl pyrrole, 5-vinyl pyrrole, 2-vinyl oxazole, 5-vinyl oxazole, 2-vinyl thiazole, 5-vinyl thiazole, 2-vinyl imidazole, 5-vinyl imidazole, 3-vinyl pyrazole, 5-vinyl pyrazole, 3-vinyl pyridazine, 6-vinyl pyridazine, 3-vinyl isoxazole, 3-vinyl isothiazoles, 2-vinyl pyrimidine, 4-vinyl pyrimidine, 6-vinyl pyrimidine, and vinyl pyrazine; wherein said vinyl heterocycle may bear one or more $C_1$–$C_6$ alkyl or alkoxy groups, cyano groups, $C_1$–$C_6$ ester groups or halogen atoms, and said vinyl heterocycles which, when unsubstituted, contain an N—H group are protected with a conventional blocking or protecting group. The most preferred monomers are methyl methacrylate, 2-ethylhexyl acrylate, n-butyl methacrylate, t-butyl methacrylate, lauryl methacrylate, allyl methacrylate, in particular methyl methacrylate (MMA) and t-butyl methacrylate.

Most preferably said monomer is methyl methacrylate.

In the context of the present invention, "aryl" (Ar) refers to a single aromatic ring or a fused aromatic ring system with two nuclei, which may be substituted or non substituted. More particular Ar refers to phenyl or naphthyl, which may be substituted from 1 to 5 times (in the case of phenyl) or from 1 to 7 times (in the case of naphthyl) with alkyl of from 1 to 20 carbon atoms, preferably 1 to 6 carbon atoms, alkyl of from 1 to 6 carbon atoms (preferably methyl) in which each of the hydrogen atoms may be independently replaced by a halogen atom (preferably a fluorine or a chlorine), alkenyl of from 2 to 20 carbon atoms, preferably from 2 to 6 carbon atoms, alkynyl of from 2 to 20 carbon atoms, preferably from 2 to 6 carbon atoms, alkoxy of from 1 to 6 carbon atoms, alkylthio of from 1 to 6 carbon atoms, phenyl, halogen, $C_2$–$C_{12}$-dialkylamino, preferably $C_2$–$C_6$-dialkylamino and phenyl which may be substituted with from 1 to 5 halogen atoms and/or $C_1$–$C_4$ alkyl groups. Preferably Ar refers to phenyl or naphthyl, which may be substituted from 1 to 3 times (in both cases) with substituents as defined above. In the present application, "aryl" may also refer to a heterocyclic ring system, preferably pyridyl, more preferably 2-pyridyl. More preferably, "aryl" refers to phenyl, phenyl substituted from 1 to 5 times with fluorine or chlorine, and phenyl substituted from 1 to 3 times with a substituent selected from the group consisting of alkyl of from 1 to 6 carbon atoms, alkoxy of from 1 to 4 carbon atoms and phenyl. Most preferably, "aryl" refers to phenyl.

In the context of the present invention, "heterocyclic rings capable of stabilizing an α-anion" refer to those heterocyclic rings which can stabilize a formal negative charge at a carbon atom covalently bound to the heterocyclic ring, such as is postulated for "living" anionic polymers. Thus, the vinyl group undergoing polymerization should be attached to the heterocyclic ring such that one or more of the heteroatoms in the heterocyclic ring stabilizes the negative charge on the "living" polymer intermediate. Accordingly, suitable vinyl heterocycles having about 4 to 5 ring members and containing from 1 to 3 heteroatoms selected from N, O, and S and including 2-vinyl pyridine, 6-vinyl pyridine, 2-vinyl pyrrole, 5-vinyl pyrrole, 2-vinyl oxazole, 5-vinyl oxazole, 2-vinyl thiazole, 5-vinyl thiazole, 2-vinyl imidazole, 5-vinyl imidazole, 3-vinyl pyrazole, 5-vinyl pyrazole, 3-vinyl pyridazine, 6-vinyl pyridazine, 3-vinyl isoxazole, 3-vinyl isothiazoles, 2-vinyl pyrimidine, 4-vinyl pyrimidine, 6-vinyl pyrimidine, and any vinyl pyrazine. The vinyl heterocycles mentioned above may bear one or more (preferably 1 or 2) $C_1$–$C_6$ alkyl or alkoxy groups, cyano groups, $C_1$–$C_6$ ester groups (COOR) or halogen atoms. Further, those vinyl heterocycles which, when unsubstituted, contain an N—H group are protected at that position with a conventional blocking or protecting group, such as a $C_1$–$C_6$ alkyl group, a tris-$C_1$–$C_6$ alkyl silyl group, an acyl group, etc.

Suitable initiators include those of the formula:

$$n[(Ar)_xP(NR^6R^7)_{4-x}]^+Q^{n-} \qquad \text{(II)}$$

wherein the symbols are as defined above.

Preferably $R^6$, $R^7$ are independently alkyl of from 1 to 5 carbon atoms or phenyl, naphthyl, phenyl having from 1 to 5 substituents or naphthyl having from 1 to 7 substituents, each of said substituents being independently selected from the group consisting of alkyl of from 1 to 20 carbon atoms, alkyl of from 1 to 6 carbon atoms in which each of the hydrogen atoms may be independently replaced by a halogen atom, alkenyl of from 2 to 20 carbon atoms, alkynyl of from 2 to 20 carbon atoms, alkoxy of from 1 to 6 carbon atoms, alkylthio of from 1 to 6 carbon atoms, phenyl, halogen, $C_1$–$C_6$-dialkylamino;

or $R^6$ and $R^7$ together may be =$P(Ar)_x$.

More preferably $R^6$ and $R^7$ are independently methyl, ethyl or isopropyl or phenyl, phenyl substituted from 1 to 5 times with fluorine or chlorine, or phenyl substituted from 1 to 3 times with a substituent selected from the group consisting of alkyl of from 1 to 4 carbon atoms, alkoxy of from 1 to 4 carbon atoms; or $R^6$ and $R^7$ together are =$P(Ar)_x$.

Most preferably $R^6$ and $R^7$ are independently methy, ethyl, isopropyl or phenyl; or $R^6$ and $R^7$ together are =$P(Ar)_x$.

Preferred organic cations are $[Ph_3P(N(^iPr)_2)_3]^+$, $[Ph_3P(NMePh)]^+$ (=MPATPP), and the most preferred cation is $[Ph_3PNPPh_3]^+$ (=PNP).

Preferably $R^8$ and $R^9$ are independently alkyl of from 1 to 20 carbon atoms, CN, C(=X)$R^3$, C(=X)$NR^4R^5$, $R^3$ being alkyl of from 1 to 20 carbon atoms, alkoxy of from 1 to 20 carbon atoms or, alkylthio of from 1 to 20 carbon atoms, $R^4$ and $R^5$ being independently alkyl of from 1 to 20 carbon atoms or being joined together to form an alkylene group of from 2 to 5 carbon atoms thus forming a 3- to 6-membered ring, and X is NR (R is $C_{1-20}$ alkyl), O or S, or $R^8$ and $R^9$ are phenyl, naphthyl, phenyl having from 1 to 5 substituents or naphthyl having from 1 to 7 substituents; and each of said substituents being independently selected from the group consisting of alkyl of from 1 to 20 carbon atoms, alkyl of from 1 to 6 carbon atoms in which each of the hydrogen atoms may be independently replaced by a halogen atom, alkenyl of from 2 to 20 carbon atoms, alkynyl of from 2 to 20 carbon atoms, alkoxy of from 1 to 6 carbon atoms, alkylthio of from 1 to 6 carbon atoms, phenyl, halogen, $C_1$–$C_6$-dialkylamino, phenyl substituted with from 1 to 5 halogen atoms and phenyl substituted with from 1 to 5 alkyl groups of from 1 to 4 carbon atoms, or $R^8$ and $R^9$ are joined together to form a ring;

examples of $R^8$ and $R^9$ being joined together to form a ring include fluorenyl and indenyl ring systems, and $R^{10}$ is preferably H, alkyl of from 1 to 20 carbon atoms, phenyl, naphthyl, phenyl having from 1 to 5 substituents or naphthyl having from 1 to 7 substituents; each of said substituents being independently selected from the group consisting of alkyl of from 1 to 20 carbon atoms, alkyl of from 1 to 6 carbon atoms in which each of the hydrogen atoms may be independently replaced by a halogen atom, alkenyl of from 2 to 20 carbon atoms, alkynyl of from 2 to 20 carbon atoms, alkoxy of from 1 to 6 carbon atoms, alkylthio of from 1 to 6 carbon atoms, phenyl, halogen, $C_1$–$C_6$-dialkylamino, phenyl substituted with from 1 to 5 halogen atoms and phenyl substituted with from 1 to 5 alkyl groups of from 1 to 4 carbon atoms or a polymer radical.

More preferably $R^8$ and $R^9$ are independently phenyl or phenyl having from 1 to 3 substituents selected from the group consisting of alkyl of from 1 to 6 carbon atoms, alkoxy of from 1 to 4 carbon atoms, phenyl and halogen; and $R^{10}$ is independently H, alkyl of from 1 to 6 carbon atoms, such as methyl, ethyl, n-propyl, i-propyl or cyclohexyl, phenyl, or phenyl having from 1 to 3 substituents selected from the group consisting of alkyl of from 1 to 6 carbon atoms, alkoxy of from 1 to 4 carbon atoms, phenyl and halogen or a polymer radical.

Most preferably, each of $R^8$, $R^9$ and $R^{10}$ is phenyl.

Preferably $R^{11}$ and $R^{12}$ are independently alkyl of from 1 to 10 carbon atoms, such as methyl, ethyl, i-propyl or cyclohexyl, $C_6$- to $C_{18}$-aryl, in particular $C_6$- to $C_{10}$-aryl, such as phenyl or naphthyl, preferably phenyl, $C_7$–$C_{15}$-aralkyl, such as benzyl, $C_3$- to $C_{18}$-organosilyl in which the tetravalent silicon atom is preferably substituted with radicals selected from the group consisting of alkyl having from 1 to 20 carbon atoms, in particular of from 1 to 10 carbon atoms, such as methyl, ethyl, i-propyl, n-butyl, t-butyl or cyclohexyl, aryl having from 6 to 18 carbon atoms, such as phenyl, and aralkyl, being formed from a $C_1$- to $C_6$-alkylene moiety, in particular a $C_1$- to $C_3$-alkylene moiety, and a $C_6$- to $C_{18}$-aryl group, in particular $C_6$- to $C_{10}$-aryl group, such as benzyl, examples are trimethylsilyl, triethylsilyl or triphenylsilyl, $C(O)R^3$, $R^3$ being preferably selected from the group consisting of alkyl having from 1 to 10 carbon atoms, such as methyl, ethyl, n-propyl, i-propyl, t-butyl or cyclohexyl, alkyl of from 1 to 10 carbon atoms having as substituents one or more halides, such as fluorine or chlorine, e.g. trifluoromethyl or 2,2,2-trifluoroethyl, aryl having from 6 to 14 carbon atoms, such as phenyl or naphthyl, and alkoxy having from 1 to 10 carbon atoms, such as O-methyl, O-ethyl, O-n-propyl, O-i-propyl, O-t-butyl or O-cyclohexyl; or $R^{11}$ and $R^{12}$ may be joined together to form a heterocycle, such as 2-pyrrolidone, 3,4-dihydropyrrol-2,5-dione or phthalimide.

Preferably $R^{13}$ and $R^{14}$ are independently alkyl of from 1 to 10 carbon atoms which can be linear or branched, such as methyl, ethyl, n-propyl, i-propyl, t-butyl; or cycloalkyl of from 3 to 10 carbon atoms, such as cyclohexyl, $C_6$- to $C_{18}$-aryl, in particular $C_6$- to $C_{14}$-aryl, such as phenyl or naphthyl;

Preferably $R^{15}$ is an organic radical of value p+q+r+s, in particular an alkylene of from 1 to 20 carbon atoms, preferably of from 2 to 10 carbon atoms, such as ethylene, 1,2-propylene, 1,3-propylene, 1,4-butylene or 1,6-hexylene, cycloalkylene, or $C_6$- to $C_{18}$-arylene, in particular $C_6$- to $C_{10}$-arylene, such as o-, m-, p-phenylene;

If $R^{10}$ is a polymer radical it may be derived from a homopolymer, a statistical copolymer or a block polymer, irrespective of the method of making such polymers. The polymer radical $R^{10}$ can thus be obtained via anionic, radical or polycondensation methods. In this respect $R^{10}$ may represent for example a polymethylmethacrylate, a polystyrene, a polyether or a polyphenylene ether radical. The molecular weight $M_w$ of polymer radical $R^{10}$ usually is in the range of 500 to 200,000 g/mol.

A preferred initiator component Q is $CR^8R^9R^{10}$ wherein $R^8$, $R^9$ and $R^{10}$ are as defined above.

Preferred initiator anions are $(Ph_3C)^-$ (=Trityl), $(C_4H_9)$ $(C_2H_5)CH(CH_2O^-)$ (=2-Ethylhexanolate), $(C_2H_5)(CH_3)$ $C=C(OMe)CO^-)$ (=EiB$^-$), $(CH_3)_3C(O^-)$ (=t-BuO$^-$).

The most preferred initiator is $[Ph_3PNPPh_3]^+$ $(Ph_3C)^-$ (=PNP-Trityl). The initiator is stable at ambient temperature and typically has a lifetime of at least 3 hours at room temperature, what was shown by UV spectroscopy (example 1).

Thus, among other methods the initiators according to the present invention in which Q is $(CR^8R^9R^{10})$ can be conveniently prepared by cation exchange (metathesis) from the corresponding alkali or alkaline earth metal carbanion and phosphonium or PNP (=Bis(triphenylphosphoranilydene) ammonium)) salts, preferably phosphonium or PNP halides. The metathesis reaction can be conducted at a temperature of −78° C. The alkali and alkaline earth metal carbanion salts can be prepared in accordance with known procedures as for example described in Ch. Elschenbroich, A. Salzer, Organometallchemie, Teubner Verlag, Stuttgart, 1986 and references cited therein (e.g., treatment of a compound of the formula $R^8R^9R^{10}$ CH with an alkali metal hydride reagent or an alkali metal alkyl reagent; direct treatment of the compound of the formula $R^8R^9R^{10}$ CH with an alkali metal; or by a metal-halide exchange between an alkali metal and the halide atom of a compound of the formula R $8R^9R^{10}C$(Hal), where (Hal) is chlorine atom, bromine atom or iodine atom, preferably chlorine atom; or by carbometallation of alkenes or alkynes). Alkali metals include lithium, sodium, potassium, rubidium and cesium, preferably lithium and potassium, and most preferably potassium. Alkaline earth metals include magnesium, calcium, strontium, barium, preferably magnesium.

The initiators according to the present invention in which Q is $NR^{11}R^{12}$, $OR^{13}$ or $SR^{14}$ can also be conveniently prepared by cation exchange at temperatures of −78° C. from the corresponding alkali or alkaline earth metal salts of nitrogen (amide), oxygen (alcoholate), or sulfide (thiolate) anions and phosphonium or PNP-salts, e.g. phosphonium or PNP-halides. The alkali and alkaline earth metal amide, oxide, (alcoholate) or sulfide (thiolate) salts can be prepared in accordance with known procedures (e.g. treatment of a compound of the formula $R^{11}R^{12}NH$, $R^{13}OH$ or $R^{14}SH$ with an alkali metal hydride reagent; direct treatment of a compound of the formula $R^{11}R^{12}NH$, $R^{13}OH$ or $R^{14}SH$ with an alkali metal; etc.). Alkali metals include lithium, sodium, potassium, rubidium and cesium, preferably lithium and potassium, and most preferably potassium. Alkaline earth metals include magnesium, calcium, strontium, barium, preferably magnesium.

Polyanions of polyamines, polyols, polythiols or compounds having a variety of abovementioned functional groups, such as compounds according to the formula $R^{15}$ $(CHR^8R^9)_p(NHR^{11})_q(OH)_r(SH)_s$ are also suitable for the preparation of initiators in which Q is $R^{15}(CR^8R^9)_p(NR^{11})_q(O)_r(S)_s$. These can also be pepared as described above by cation exchange at temperatures of $-78°$ C. from the corresponding alkali or alkaline earth metal salts, e.g. by treatment of a compound $R^{15}(CHR^8R^9)_p$ $(NHR^{11})_q(OH)_r(SH)_s$ with an alkali or alkaline earth metal or with an alkali or alkaline earth hydride reagent. Such initiators can be prepared from, for example, dianions like for example $[R^{15}(CR^8R^9)_2]^{2-}$ wherein $R^8$ and $R^9$ are as defined above and $R^{15}$ is —(CH$_2$CH$_2$)— by treating vinyl compounds with naphthyl sodium (NaC$_{10}$H$_8^-$) (cf. M. Morton, Anionic Polymerization: Principles and Practice, Academic Press, New York, 1983), or from, for example, a diamide, a dialcoholate or a dithiolate, which is then metathesized with a phosphonium or PNP salt, e.g. a phosphonium halide, to provide a multifunctional initiator of the formula $n[[(Ar)_xP(NR^6R^7)_{4-x}]^+[R^{15}(CR^8R^9)_p(NR^{13})_q(O)_r(S)_s]^{n-}$ where p+q+r+s>2, and wherein $R^4$, $R^5$, $R^6$, $R^7$, $R^8$, $R^9$, $R^{11}$ and $R^{15}$ are as defined above.

The cation metathesis reaction occurs very rapidly (e.g., within seconds) and quantitatively, even at $-78°$ C. A bathochromic shift in the maximum absorbance wavelength ($\lambda_{max}$) is observed during cation metathesis. For example, the typical red color of a solution of Ph$_3$C$^-$K$^+$ in THF (2.0×10$^{-3}$ M, $\lambda_{max}$=492 nm, $\epsilon$=26,420 L/mole cm) changes into a deep maroon color characteristic of the corresponding organic cation salt solution (Ph$_3$C$^-$ Ph$_3$NPPh$_3^+$, $\lambda_{max}$=520 nm) upon addition of Ph$_3$NPPh$_3^+$ Cl$^-$, which is insoluble in THF.

Many phosphonium reagents and PNP reagents, e.g. halide, nitrate or borate salts are commercially available. Others can be made by reacting a phosphine with an alkyl or aryl halide in accordance with known methods and procedures (cf. Homer et al., Chem. Ber. 1966, 99, 2782).

The alkali metal salt, e.g. halide salts, formed as a result of cation exchange can be filtered off prior to use of the initiator in polymerization, but filtration is not necessary for polymerization to be successful.

Also mixtures of initiators according to the present invention as disclosed above and below can be employed. Initiators can either be derived from species with differences in the phosphonium substituents or with differences in Q, or with differences in both. For example mixtures of carbanionic amide, oxide or sulfide based initiators as well as mixtures of any combination of these species can be employed.

Initiators according to the present invention having as initiator compounds $Q^-$ $^-CR^8R^9R^{10}$, $^{-NR^{11}}R^{12}$, $^-OR^{13}$ or $^-SR^{14}$ can be employed in anionic polymerization methodology to form homo- or copolymers of, for example, acrylates and methacrylates.

The multifunctional initiators corresponding to or containing n $[(Ar)_xP(NR^6R^7)_{4-x}]^+$ $[R^{15}(CR^8R^9)_p(NR^{11})_q(O)_r(S)_s]^{n-}$ as mentioned above can be used in the process of the present invention to produce block polymers such as branched, diblock, triblock or multiblock polymers.

Appropriate dianions as initiators for block polymer synthesis according to the present invention are for example
$[[(Ar)_xP(NR^6R^7)_{4-x}]^+]2 (R^9R^8C(R^{15})CR^8R^9)^{2-}$
$[[(Ar)_xP(NR^6R^7)_{4-x}]^+]2 (R^{11}N(R^{15})NR^{11})^{2-}$
$[[(Ar)_xP(NR^6R^7)_{4-x}]^+]2 (OR^{15}O)^{2-}$
$[[(Ar)_xP(NR^6R^7)_{4-x}]^+]2 (SR^{15}S)^{2-}$
where $R^6$, $R^7$, $R^8$, $R^9$, $R^{11}$ and $R^{15}$ are as defined above. Such initiators can be used in the process of the present invention to make a triblock polymer having, for example, a first, central poly(meth)acrylate or polyacrylonitrile block, and second, distinct poly(meth)acrylate or polyacrylonitrile blocks at the ends of the first, central block.

The present invention is thus also concerned with methods of making block polymers of the formula

A—(R$^9$R$^8$C(R$^{15}$)CR$^8$R$^9$)—A

A—(R$^{11}$N(R$^{15}$)NR$^{11}$)—A

A—(OR$^{15}$O)—A

A—(SR$^{15}$S)—A

B—A—(R$^9$R$^8$C(R$^{15}$)CR$^8$R$^9$)—A—B

B—A—(R$^{11}$N(R$^{15}$)NR$^{11}$)—A—B

B—A—(OR$^{15}$O)—A—B

B—A—(SR$^{15}$S)—A—B

C—B—A—(R$^9$R$^8$C(R$^{15}$)CR$^8$R$^9$)—A—B—C

C—B—A—(R$^{11}$N(R$^{15}$)NR$^{11}$)—A—B—C

C—B—A—(OR$^{15}$O)—A—B—C

C—B—A—(SR$^{15}$S)—A—B—C etc. (i.e., with successive blocks attached to each end), where A, B, C are distinct polymer blocks produced by anionic polymerization of one or more monomers of the formula:

wherein $R^1$ and $R^2$ are as defined above, using at least one of the present phosphonium or PNP salts of carbon-, nitrogen-, oxygen- and sulfurbased anions.

The polymerization reaction is conducted at a temperature of from $-78°$ C. to +60° C., preferably of from $-20°$ C. to +40° C., more preferably of from 0° C. to +30° C.

Branched polymers having three or more chains can be prepared from, for example, appropriate phosphonium or PNP salts of compounds having three or more carbanions, or nitrogen, oxygen and sulfur anions (so-called "multianionic" initiators), such as tris-, tetra-, penta-, or hexa (hydroxymethyl)benzene, glycerol, erythriol, diethylene triamine, dithioerythriol, dithiothreitol or dihydroxycyclohexane.

Generally initiator components of the formula $n[(Ar)_xP(NR^6R^7)_{4-x}]^+[R^{15}(CR^8R^9)_p(NR^{11}R^{12})_q(O)_r(S)_s]^{n-}$ can be used for the production of branched or multiblock polymers, where n can be at least 2, preferably from 2 to 6.

Thus, a preferred initiator is one in which n is 2, and $R^{15}$ is —(CH$_2$CH$_2$)—. Such a dimeric initiator having for example the formula $[[(Ar)_xP(NR^6R^7)_{4-x}]^+]2$ (Ar$_2$C$^-$CH$_2$)$_2$ where Ar is aryl can be prepared by reacting a 1,1-diarylethylene (preferably 1,1-diphenylethylene) with an alkali metal in THF, followed by metathesis with two equivalents of a phosphonium or PNP halide of the formula $[(Ar)_xP(NR^6R^7)_{4-x}]^+$ T$^-$, wherein T$^-$ is a halide, preferably a bromide or a chloride. Other dimeric initiators of the formula $[[(Ar)_xP(NR^6R^7)_{4-x}]^+]_2$ $[(R^8R^9CCH_2)_2]^{2-}$, where $R^8$ and $R^9$ are other than Ar, can be made in accordance with this procedure or in combination with known reactions for reducing a 1,1-disubstituted ethylene by electron transfer (e.g. with an alkali metal, by electrochemical reduction at a cathode, etc.) as long as the $R^8$ and $R^9$ groups are not also reduced under the reaction conditions.

The weight or number average molecular weight of a block in the present block polymers may range from 300 to 500,000 g/mol, more preferably 500 to 300,000 g/mol, and most preferably 1,000 to 100,000 g/mol. Similar to the monodisperse polymer described above, the weight or number average molecular weight of block B may range from 500 g/mol to 300,000 g/mol, preferably from 1,000 to 200,000 g/mol, and more preferably from 2,000 to 60,000 g/mol. The present block copolymers are also preferably "monodisperse" in that they may have a $M_w/M_n$ value of $\leq 2.0$, preferably $\leq 1.5$, and most preferably $\leq 1.2$. A preferred block copolymer is one in which block A is polystyrene, poly(α-methylstyrene) or copoly(styrene-α-methylstyrene), and block B is polyacrylonitrile.

Triblock polymers can be prepared from dianionic initiators described above by reacting the dianionic initiator with a first monomer to prepare a "living" anionic first block, followed by reacting the "living" anionic first block with a second monomer to provide terminal blocks on each end of the "living" first block. Thus, the present invention also concerns a method for preparing a triblock copolymer comprising: reacting a first monomer of the formula, with an initiator of the formula and conducting the reaction at a temperature of from −78° C. to +60° C., preferably of from −20° C. to +40° C., more preferably of from 0° C. to +30° C., in the presence or the absence of solvent, for a length of time sufficient to polymerize the first monomer, wherein the substituents and indices are as defined above, adding a second monomer of the formula, where $R^1$ and $R^2$ are as defined above, the second monomer being distinct from the first monomer, at said temperature and reacting for a length of time sufficient to form a triblock polymer intermediate,
quenching the triblock polymer intermediate with an acyl halide, an acid anhydride or a substance containing an active hydrogen atom to form a triblock polymer; and
isolating the formed triblock polymer.

Successive blocks can be added to each end of the "living" anionic chain by successively adding different monomers or by changing reaction conditions appropriately after the first "adding" step above, but prior to quenching.

The present invention also encompasses an initiator corresponding to or containing a compound according to the following formula:

$$[(Ar)_xP(NR^6R^7)_{4-x}]^+(Q')^- \qquad (III)$$

wherein $R^6$, $R^7$, Ar (aryl) and x are as defined above,

Q' is $R^{16}$—$CR^8R^9R^{10}$, $R^{16}$—$NR^{11}R^{12}$, $R^{16}$—$OR^{13}$, $R^{16}$—$SR^{14}$, $R^{16}$—Z;
wherein $R^8$, $R^9$, $R^{10}$, $R^{11}$, $R^{12}$, $R^{13}$, $R^{14}$, and $R^{16}$ are as defined above, and
Z is a radical derived from an initiator for the anionic polymerization of anionic polymerizable monomers other than radicals derived from compounds II or III.

The polymer group $R^{16}$ can for example be derived from an anionic polymerization of one or more anionically polymerizable monomers by which a living polymer species is obtained or by a polymerization process according to the present invention.

Thus, the present invention is also concerned with a method for preparing an initiator corresponding to or containing $[(Ar)_xP(NR^6R^7)_{4-x}]^+(Q')^-$ (III), comprising the steps of mixing a monomer of the formula wherein $R^1$ and $R^2$ are as defined above,
with an initiator corresponding to or containing $[(Ar)_xP(NR^6R^7)_{4-x}]^+(Q)^-$ (II), wherein $R^6$, $R^7$, Ar (aryl) and x are as defined above and Q is $CR^8R^9R^{10}$, $NR^{11}R^{12}$, $OR^{13}$, $SR^{14}$, wherein $R^8$ to $R^{14}$ are as defined above, and conducting the reaction at a temperature of from −78° C. to +60° C., preferably of from −20° C. to +40° C., more preferably of from 0° C. to +30° C., in the presence or absence of a solvent, for a time sufficient to polymerize the monomer(s) and to form a reaction mixture, and thus to form the compound (III), in which $R^{16}$ represents the living polymer chain according to the invention; and isolating the formed compound (III) without a quenching step.

Such an initiator can also be obtained by anionically polymerizing one or more anionically polymerizable monomers to form a "living" polymer anion salt wherein $G^+$ is an inorganic cation, in particular a cation selected from the group IA, IIA, and IIIA of the periodic table of the elements such as lithium, sodium, potassium, magnesium, calcium, boron or aluminum. $R^{16}$ is a polymer radical, having for instance a molecular weight of from 500 to 3000 000 g/mol, in particular of from 1,000 to 100,000 g/mol. Z may be a radical derived from an initiator for the anionic polymerization of anionic polymerizable monomers other than radicals derived from compounds II or III. Radicals Z may either be derived from alkali organyl or alkaline earth organyl compounds, e.g. n-butyl lithium or s-butyl lithium, or from metal-free systems like the ester enolate/protonated P4-phosphazene base system by Seebach and Pietzonka (vide infra) or the alkoxide/n-Bu$_4$N$^+$system by Reetz et al (vide infra). Thus Z may be for example a butyl, a C-C-linked ester or a O-linked alkoxy moiety.

Said polymer anion salt is metathesized with a phosphonium or PNP salt of the formula where $Y^-$ is an inorganic anion, preferably selected from the group consisting of a halide, nitrate, nitrite, borate, trifluoromethanesulfonate, $(SO_4)_{0.5}$, $(PO_4)_{0.33}$ and $(CO_3)_{0.5}$ and $R^6$ and $R^7$ are as defined above, at −78° C. to provide compound (III).

"Living" polymer anion salts can be prepared in accordance with known methods, for example, by organometal reagent-initiated (e.g ,a $C_1$–$C_4$-alkyllithium-initiated) polymerization of an anionically polymerizable monomer (e.g, styrene). These compounds can be used to initiate the polymerization of the next comonomer. Suitable monomers for preparation of such a "living" polymeric anion include styrene, α-methylstyrene, styrene or α-methylstyrene having 1 to 5 (preferably 1 to 3, most preferably 1) $C_1$–$C_4$-alkyl and/or $C_1$–$C_4$-alkoxy substituents on the phenyl ring, butadiene, isoprene, dimethylbutadiene, or mixtures thereof. The polymeric anion can then be reacted with a 1,1-diarylethylene (for example, 1,1-diphenylethylene) to form a polymer-diarylmethyl anion, which is then metathesized with a phosphonium or PNP halide to provide an initiator of the formula:

polymer-$(CH_2CAr_2)^-[(Ar)_xP(NR^6R^7)_{4-x}]^+$ wherein $R^6$, $R^7$ and Ar (aryl group) are as defined above. This initiator can be used in the process of the present invention to make a block copolymer having a first polystyrene block and a second polymer (e.g., poly(meth)acrylate or polyacrylonitrile) block.

"Living" polymer anions as described above can also be reacted with, for example, aziridine, an epoxide or a thiamine to form polymer initiators of the following formulas:

polymer-$(CR^8R^9(R^{15})NR^{11}\ )^-[(Ar)_xP(NR^6R^7)_{4-x}]^+$ polymer-$(CR^8R^9(R^{15})O)^-[(Ar)_xP(NR^6R^7)_{4-x}]^+$ polymer-$(CR^8R^9(R^{15})S)^-[(Ar)_xP(R^6R^7)_{4-x}]^+$ where $R^6$, $R^7$, $R^8$, $R^9$, $R^{11}$ and $R^{15}$, Ar and x are as defined above.

Initiators according to the formula (III) which are obtained according to the method of the present invention may also be directly employed, i.e. without an isolating step, in the polymerization of monomers of the formula:

which are distinct from the first monomer(s) used. Monomers of the above formula can then either be added to the initiator (III), neat or in solution.

The isolating step for compound (III) is conducted in accordance with known procedures, such as precipitating the polymeric initiator and filtering the precipitated initiator. Precipitation can be conducted using a suitable inert non-solvent, such as a $C_5$–$C_8$-alkane or -cycloalkane, e.g. hexane, mixtures of hexanes, heptane, cyclohexane, pentane or mineral spirits. Preferably, the non-solvent for precipitating is hexane or mixtures of hexanes.

The polymeric initiators corresponding to or containing a compound according to formula (III) are then used to initiate the polymerization of the next anionically polymerizable comonomer. These initiators can for instance be used in the process of the present invention to make a block polymer, having, for example a first polystyrene block and a second poly(meth)acrylate or polyacrylonitrile block.

Thus, the present invention also encompasses a method for preparing a block polymer, comprising the steps of:
anionically polymerizing one or more first monomers, preferably by reacting said first monomer(s) with a $C_1$–$C_4$-alkyllithium reagent, to form a polymer anion;
reacting said polymer anion for example with a 1,1-diarylethylene to form a polymer-diarylmethyl anion;
metathesizing said polymer-diarylmethyl anion with a phosphonium halide salt of the formula:

$[(Ar)_xP(NR^6R^7)_{4-x}]^+Y^-$ where Y is an inorganic anion, selected from the group consisting of a halide, nitrate, nitrite, borate, trifluoromethanesulfonate, $(SO_4)_{0.5}$, $(PO_4)_{0.33}$ and $(CO_3)_{0.5}$ and $R^6$ and $R^7$ are either independently alkyl of from 1 to 20 carbon atoms, alkoxy from 1 to 20 carbon atoms or aryl or are joined together to form, together with the N-atom a 3- to 6-membered N-heterocyclic ring, additionally $R^6$ and $R^7$ together may be =$P(Ar)_x$; Ar (aryl), refers to a single aromatc ring or a fused aromatic ring system with two nuclei, and x is an integer from 1 to 3, to provide an initiator;
reacting said initiator with one or more monomers of the formula:

at a temperature of from −78° C. to +60° C., in the presence or absence of solvent, for a length of time sufficient to polymerize the first monomer, wherein $R^1$ is selected from the group consisting of H, CN, $CF_3$, alkyl of from 1 to 6 carbon atoms and aryl, and $R^2$ is selected from the group consisting of CN, $C(=X)R^3$, $C(=X)NR^4R^5$ and heterocyclic rings capable of stabilizing an α-anion, where X is NR (R is $C_1$–$C_{20}$ alkyl), O or S, $R^3$ is alkyl of from 1 to 20 carbon atoms, alkoxy of from 1 to 20 carbon atoms or alkylthio of from 1 to 20 carbon atoms, and $R^4$ and $R^5$ are independently alkyl of from 1 to 20 carbon atoms or are joined together to form an alkylene group of from 2 to 5 carbon atoms, thus forming a 3- to 6-membered ring, to form a reaction mixture;
quenching the reaction mixture with an acyl halide, an acid anhydride or a substance containing an active hydrogen atom to form a block polymer; and isolating the formed block polymer.

The present invention is thus also concerned with a method of making block polymers of the formula:

polymer-$(CH_2CAr_2)$—A polymer-$(CR^8R^9(R^{15})NR^{11})$—A polymer-$(CR^8R^9(R^{15})O)$—A polymer-$(CR^8R^9(R^{15})S)$—A where the polymer is one produced by anionic polymerization (preferably of styrene, α-methylstyrene, styrene or α-methylstyrene having from 1 to 5 $C_1$–$C_4$-alkyl and/or $C_1$–$C_4$-alkoxy substituents on the phenyl ring, butadiene, isoprene, dimethylbutadiene, or mixtures thereof), $R^8$, $R^9$, $R^{11}$, $R^{15}$ and Ar (aryl) are as defined above, and A is one or more distinct polymer block(s) of one or more monomers of the formula:

wherein $R^1$ and $R^2$ are as defined above.

Generally the method of making block polymers also encompasses the synthesis of compounds like, for example, polymer-A, where the polymer is one produced by anionic polymerization as described above, in particular a homo- or copolymer of acrylates or methacrylates, and A is one or more distinct polymer blocks of one or more monomers of the formula above.

The weight or number average molecular weight of each of blocks may range from 500 g/mol to 300,000 g/mol, preferably from 1,000 to 200,000 g/mol, and more preferably from 2,000 to 60,000 g/mol. The present triblock copolymers are also preferably "monodisperse" in that they may have a $M_w/M_n$ value of $\leq 2.0$, preferably $\leq 1.5$, and most preferably $\leq 1.2$.

The polymerization methods described can be conducted with or without a solvent. In the context of the present invention when a small quantity of liquid is required to solubilize or partially solubilize the initiator the polymerization is still run without a solvent.

Suitable solvents for the reacting or polymerizing step are non polar organic solvents including ethers, cyclic ethers, aromatic hydrocarbon solvents, and mixtures thereof. Suitable ethers include compounds of the formula $R^{17}OR^{18}$, in which each of $R^{17}$ and $R^{18}$ is independently an alkyl group of from 1 to 6 carbon atoms which may be further substituted with a $C_1$–$C_4$-alkoxy group. Preferably, when one of $R^{17}$ and $R^{18}$ is methyl, the other of $R^{17}$ and $R^{18}$ is alkyl of from 4 to 6 carbon atoms or $C_1$–$C_4$-alkoxyethyl. Examples include diethyl ether, ethyl propyl ether, dipropyl ether, methyl t-butyl ether, di-t-butyl ether, glyme (dimethoxyethane), diglyme (diethylene glycol dimethyl ether), etc.

Suitable cyclic ethers include THF and dioxane. Suitable aromatic hydrocarbon solvents are mononuclear aromatic hydrocarbons including benzene, toluene, o-xylene, m-xylene, p-xylene and any isomer or mixture of isomers of cumene and ethyl benzene.

The initiator should be at least partially soluble in the solvent. Thus, when using an aromatic solvent, the reaction may be advantageously promoted by increasing the lipophilicity of the initiator (e.g., having a $C_6$–$C_{20}$-alkyl substituent in one or both of the ionic components [preferably at least in the organic cation]). For example, if the initiator has the formula $[(Ar)_xP(NR^6R^7)_{4-x}]^+ Ar'_3C^-$, where each Ar and Ar' are independently an aryl group, one or more of the Ar and Ar' groups should include one or more alkyl substituents having from 1 to 20 carbon atoms, preferably having from 4 to 20 carbon atoms and more preferably having from 6 to 20 carbon atoms. To avoid molecular weight distribution broadening, the polymer should also be soluble in the solvent selected.

The polymerization may be conducted by dropwise addition of a solution of monomer (e.g., 0.01–5.0 M, preferably 0.1–2.0 M and most preferably about 1.0 M in THF) into a solution of initiator in THF (e.g., from $10^{-5}$ to $10^{-1}$, preferably from $10^{-4}$ to $10^{-2}$ and most preferably about $2 \times 10^{-3}$ molar equivalents in THF with respect to moles of monomer).

The rate of initiation is very rapid, as observed by an instantaneous change in color from deep maroon to brick-red, characteristic of a polymerization solution, becoming complete typically in a matter of seconds.

Although the present reaction may be conducted at a temperature of from –78° C. to +60° C., the preferred range is from –20° C. to +40° C., more preferably from 0° C. to +30° C.

The organic phosphonium or PNP cation is believed to facilitate the formation of narrow MWD polymers at ambient temperature by reducing the rate of termination (e.g., by intramolecular Claisen condensation reaction), relative to the rate of propagation.

Termination of the polymerization using an appropriate quenching reagent rapidly gives a light yellow solution. Suitable quenching reagents in the present process include acyl halides, acid anhydrides and substances containing an active hydrogen atom.

Suitable acyl halides include halides, preferably chlorides of organic acids, including carboxylic acids, sulfonic acids, phosphonic acids, etc. Such acids are suitably of the formula $R^{19}COL$, $R^{19}SO_2L$ and $R^{19}P(=O)(OR^{20})L$, in which $R^{19}$ is alkyl of from 1 to 20 carbon atoms in which each of the hydrogen atoms may be independently replaced by a halide (preferably a fluoride or a chloride), alkenyl of from 2 to 20 carbon atoms, alkynyl of from 2 to 10 carbon atoms, phenyl which may be substituted with from 1 to 5 halogen atoms or alkyl groups of from 1 to 4 carbon atoms, or aralkyl in which the aryl group is phenyl or substituted phenyl and the alkyl group is from 1 to 6 carbon atoms; L is a fluorine, chlorine, bromine or iodine atom, preferably a chlorine atom; and R is alkyl of from 1 to 4 carbon atoms. Preferred acyl halides include benzenesulfonyl chloride, toluenesulfonyl chloride and those of the formula $R^{21}COL$, in which $R^{21}$ is alkyl of from 1 to 4 carbon atoms, vinyl, 2-propenyl or phenyl, and L is a chlorine atom (e.g., acetyl chloride, propionyl chloride, (meth)acryloyl chloride and benzoyl chloride). The most preferred acyl halide is methacryloyl chloride.

Suitable acid anhydrides include those of the formula $(R^{19}CO)_2O$, where $R^{19}$ is as defined above. Preferred acid anhydrides include acetic anhydride, propionic anhydride, and (meth)acrylic anhydride.

Active hydrogen atom-containing substances include those substances in which a hydrogen atom is attached to a heteroatom, and which have a $pK_a$ of about 18 or less. Such compounds include water, alcohols of from 1 to 6 carbon atoms, aqueous solutions of ammonium salts (e.g., ammonium halide or ammonium carbonates), etc., preferably the quenching is conducted with water or an alcohol of from 1 to 6 carbon atoms, with methanol being a preferred quenching agent. The most preferred quenching agent is a mixture of methanol and acetic acid.

In some cases (for example, in the polymerization of vinyl pyridine), up to 10 equivalents of alcohol or water are necessary to quench the polymerization. Thus, it is believed that small quantities of protic solvents may be tolerated in the present method. As a consequence, it may not be necessary to rigorously purify and dry all starting materials prior to use.

The present isolating step is conducted in accordance with known procedures and methods, such as precipitating the polymer and filtering the precipitated polymer. Precipitation can be conducted by using a suitable $C_5$–$C_8$-alkane or cycloalkane solvent, such as hexane, heptane, cyclohexane, pentane, mineral spirits, or a $C_1$–$C_6$-alcohol, such as methanol, ethanol or isopropanol, or any mixture of suitable solvents. Preferably, the solvent for precipitating is n-hexane, a mixture of hexanes, or methanol.

The precipitated polymer can be filtered by gravity or by vacuum filtration, in accordance with known methods (e.g., using a Buchner funnel and an aspirator). The polymer can then be washed with the solvent used to precipitate the polymer, if desired. The steps of precipitating, filtering and washing may be repeated, as desired. The polymer may also be isolated by removing the solvent in vacuo, adding for example benzene to the residue, filtering, washing and drying the resulting precipitate.

Once isolated, the polymer may be dried by drawing air through the polymer, by vacuum, etc., in accordance with known methods (preferably by vacuum). The present polymer may be analyzed and/or characterized by size exclusion chromatography, in accordance with known procedures.

The syndiotactic content of PMMA prepared by the present process at 25° C. is moderately high (about 40–90%). The syndiotacticity can be increased by conducting the reaction at a lower temperature. The stereochemistry of PMMA produced by the present method is similar to that obtained by other MMA polymerizations at comparable temperatures.

The polymerization is generally conducted in a batch system or, preferably in a Flow Tube Reactor.

Control of molecular weight is possible, and is optimal, when polymerization is performed immediately after the formation of the phosphonium-containing initiator. The optimum control of molecular weight is best provided using a Flow Tube Reactor.

A continuous flow reactor system (such as those conventional continuous flow reactors known in the art) will also help to overcome potential problems with batch polymerization, which may include, for example, generation of an appreciable amount of heat in a continuous flow system, the heat of reaction may be dissipated more efficiently than in a batch system, where some contents of the reaction mixture may be relatively far removed from a heat-exchange surface.

The polymers produced by the present method are "monodisperse"; that is, the polymers have a narrow molecular weight distribution. In its broadest sense, a "monodisperse"; polymer has a ratio of weight average molecular weight to number average molecular weight ($M_W/M_n$) of 2.0 or less, more preferably of 1.5 or less, and most preferably of 1.2 or less.

The number average molecular weight of polymer produced by the present method depends linearly on the conversion.

Further initiators besides triphenylmethyl (Trityl) suitable for use in the present invention are the phosphonium or PNP salts of 2-ethylhexanolate, ethylisobutyrate and t-butanolate.

Having generally described the present invention, a further understanding can be obtained by reference to the following specific examples, which are provided herein for purposes of illustration only and are not intended to be limiting of the present invention.

EXAMPLES

Organic Cations used:

PNP$^\oplus$

TTPP$^\oplus$
(comparative example)

MPATPP$^\oplus$

Bis(triphenylphosphoranilydene)ammonium-chloride (PNP-(Cl*))

Triphenylmethyl-triphenylphosphonium-chloride (TTPP-(Cl*))

N-Methyl, N-Phenyl-amino-triphenylphosphonium-iodide (MPATPP-(I*))

The counter anion of the organic cation used before cation metathesis is set in parenthesis.

Initiator Anions used:

Trityl

2-Ethylhexanolate

-continued

EiB⁻ tBuO⁻

Triphenymethyl-Potassium (resp. Lithium) (Trityl(K), Trityl(Li))

Potassium-2-ethylhexanolate (2-Ethylhexanolate(K))

α-Lithio-ethylisobutyrate (EiB(Li))

Potassium-t-butanolate (t-BuOK)

Reagents and Solvents

The work was carried out in a glove box under nitrogen. THF was titrated with a tritylpotassium/THF solution to a persistent red colour and then recondensed under reduced pressure.

PNP-Cl, MPATPP-I, TTPP-Cl (Aldrich or Fluka 97%) were dried overnight at about 80° C. in a high vacuum.

MMA, nBuA, EHA (BASF) were purified by distillation under reduced pressure (45 mbar in a Im Sulzer packed column), followed by stirring over $CaH_2$, degassing and distillation under high vacuum.

Triphenylmethylpotassium (Trityl-K)

Crushed Triphenylmethane (Aldrich 99%) was purified by sublimation and then admixed in THF with sodium-potassium alloy (1:3). After 24 h stirring at room temperature the remaining metal was filtered off and the $Ph_3CK$/THF solution was stored in an ampoule. The concentration of the solution was determined by Gilmann-Doubletitration.

Alternatively, the initiator can be precipitated by adding dry and olefin free hexane and used as a solid.

Triphenylmethyllithium (Trityl-Li)

Crushed Triphenylmethane (Aldrich 99%) was purified by sublimation and then admixed in THF with a n-Butyllithium solution (1.6 M, Aldrich). After 2 h stirring the salt was precipitated with dry and olefine free hexane, filtered, washed with hexane and dried.

EiBLi and tBuOK

EiBLi and tBuOK were prepared as described in the literature (Lochmann, L. et al.; J. Organomet. Chem. 50, 9 (1973).

Potassium 2-ethylhexanolate

Dried 2-Ethylhexanol was admixed in THF with sodium-potassium alloy (1:3). After stirring for a few days at room temperature the remaining metal was filtered off and the solvent and a possible excess of alcohol were removed in a high vacuum.

EXAMPLE 1

Initiator Trityl-PNP

Figure 1A:
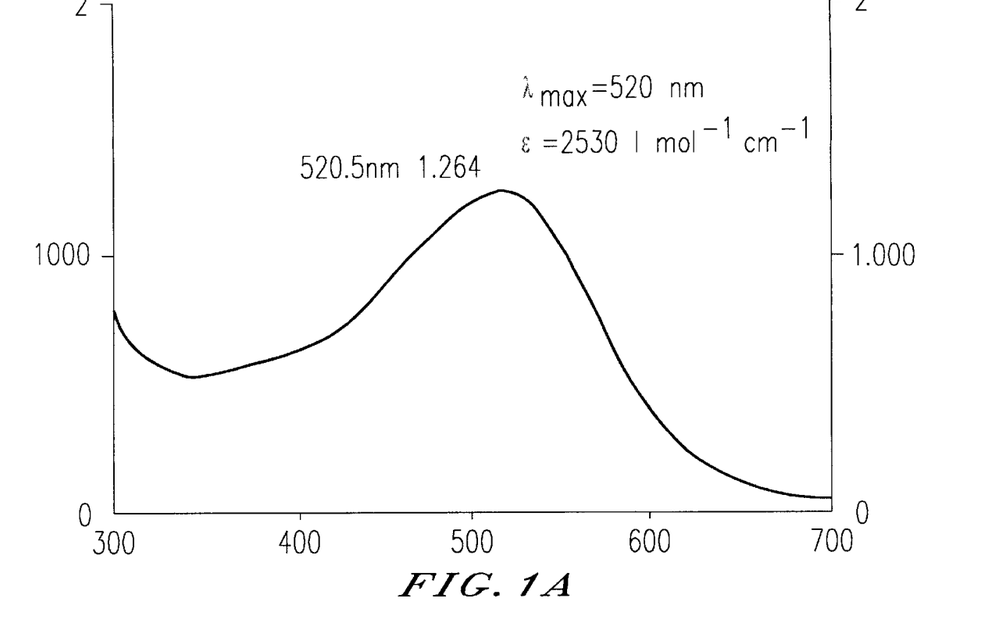
FIG. 1A UV spectrum of 5×10$^{-4}$ mole/L Trityl-PNP in THF at room temperature after 15 minutes, cell path length 1 cm.
Figure 1B:
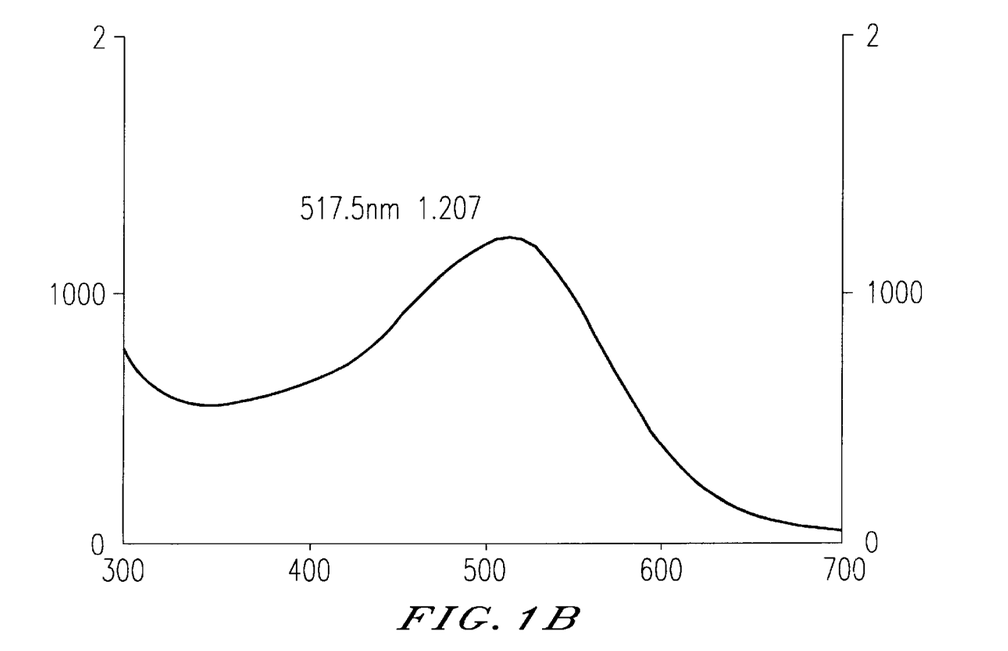
FIG. 1B UV spectrum of 5×10$^{-4}$ mole/L Trityl-PNP in THF at room temperature after 3 hours, cell path length 1 cm.

The initiator was prepared by cation metathesis by adding PNP-Chloride to a $Ph_3CK$/THF solution. The cation metathesis was monitored by UV-spectroscopy. A bathochromic shift in the maximum absorbence wavelength ($\lambda_{max}$) is observed during cation metathesis. The typical red colour of a solution of $PH_3CK$ in THF ($\lambda_{max}$=492 nm) changes into a deep maroon colour, which is characteristic for the corresponding organic salt solution ($\lambda_{max}$=520 nm) upon addition of $Ph_3PNPPh_3Cl$. After more than 3 h at room temperature, a decomposition of the initiator can be observed by a shift of the maximum absorbence wavelength to smaller wavelength. FIG. 1 shows the corresponding UV-spectra.

Polymerization Reactions

General Procedures

The work was carried out under nitrogen in a glove box and high vacuum break-seal techniques were utilized in the experiments. All apparatures were dried by heating in high vacuum and purging with nitrogen.

A typical polymerization involved 3 major steps: cation metathesis, polymerization, and termination.

Reaction in a Batch System

The initiator was prepared in situ by adding to the solution of the respective anion in THF the organic salt. The solution was transferred in the reactor and the monomer (e.g. MMA), diluted with THF, was added at the reaction temperature. The volume of the reaction mixture was about 50 to 100 ml. After the appropriate reaction time the polymerization was stopped with methanol/acetic acid (9/1). The solvent was removed in vacuo, the residue was mixed with benzene, filtered and freeze-dried.

Reaction in a Flow Tube Reactor

The initiator was prepared in situ by adding the organic salt to a solution of the respective anion in THF. The polymerization reaction was started by mixing the monomer solution and the initiator solution with a standard for GC analysis in the mixing nozzle of the Flow Tube Reactor. The reaction was stopped at the end of the flow tube with methanol/acetic acid (9/1). After 10 to 20 s about 20 to 40 ml of the reaction mixture were collected for GC- and GPC-analysis.

The samples for GPC-analysis were dried, the polymer was mixed with benzene, filtered after 24 h and finally freeze-dried.

Molecular Weights by GPC

Calibration plots of PMMA- and PnBuA-standards, which were characterized by MALDI-TOF-MS and light scattering, were used. Only the high molecular peak was considered for the interpretation of the eluograms. This is equivalent to a precipitation of the polymer samples in the workup. A calibration plot for PEHA and PtBA was obtained by universal calibration from bibliographical data by using PMMA-polymer standards.

The following tables list the results of the polymerizations using diffrent initiators and monomers at various temperatures.

Polymeriztion Experiments using Methylmethacrylate (MMA)

EXAMPLE 2

Polymerization of MMA in THF in a Flow Tube Reactor at different temperatures; initiator: Triyl(K*)-PNP(Cl*)

The metallic counter ion of the initiator anion and the counter ion of the organic cation used before cation metathesis are set in parenthesis

| experiment | T/° C. | [Trityl-PNP]/ $10^3$ (mol/l) | [MMA]/ (mol/l) | reaction time (s) | monomer-conversion (%) | $M_n$ (exp) | $M_w/M_n$ |
|---|---|---|---|---|---|---|---|
| 1 | −23 | 2 | 0.2 | 0.252 | 99 | 8700 | 1.12 |
| 2 | +1.5 | 2 | 0.2 | 0.102 | 98 | 7300 | 1.14 |
| 3 | +23 | 2 | 0.2 | 0.102 | 98 | 7100 | 1.22 |

EXAMPLE 3

Polymerization of MMA in THF in a Flow Tube Reactor at about 0° C.; initiator: Trity(K)-PNP(Cl)with variation of the initiator concentration

| experiment | T/° C. | [Trityl-PNP]/10³ (mol/l) | [MMA]/ (mol/l) | reaction time (s) | monomer-conversion (%) | $M_n$ (exp) | $M_w/M_n$ |
|---|---|---|---|---|---|---|---|
| 4 | +2 | 0.2 | 0.2 | 0.978 | 100 | 164100 | 1.15 |
| 5 | +0.3 | 0.5 | 0.2 | 0.504 | 93 | 43700 | 1.14 |
| 6 | +0.3 | 0.9 | 0.2 | 0.246 | 94 | 21000 | 1.13 |
| 7 | +0.8 | 2 | 0.2 | 0.158 | 96 | 11700 | 1.15 |

EXAMPLE 4

Polymerization of MMA in THF in a Flow Tube Reactor at different temperatures; initiator: Trity(Li)-PNP(Cl)

| experiment | T/° C. | [Trityl-PNP]/10³ (mol/l) | [MMA]/ (mol/l) | reaction time (s) | monomer-conversion (%) | $M_n$ (exp) | $M_w/M_n$ |
|---|---|---|---|---|---|---|---|
| 8 | −20 | 2 | 0.2 | 0.417 | 16 | 1900 | 1.45 |
| 9 | +0 | 2 | 0.2 | 0.180 | 20 | 2600 | 1.27 |
| 10 | +22 | 2 | 0.2 | 0.104 | 29 | 4850 | 1.29 |

EXAMPLE 5

Polymerization of MMA in THF in a batch system; initiator: Trity(Li)-PNP(Cl)

| experiment | T/° C. | [Trityl-PNP]/10³ (mol/l) | [MMA]/ (mol/l) | reaction time (s) | monomer-conversion (%) | $M_n$ (exp) | $M_w/M_n$ |
|---|---|---|---|---|---|---|---|
| 14 | −25 | 2 | 0.2 | 30 | 100 | 16200 | 1.23 |

EXAMPLE 6

Polymerization of MMA in THF in a Flow Tube Reactor at different temperatures; initiator: EiB(Li)-PNP(Cl)

| experiment | T/° C. | [EiBLi-PNP]/10³ (mol/l) | [MMA]/ (mol/l) | reaction time (s) | monomer-conversion (%) | $M_n$ (exp) | $M_w/M_n$ |
|---|---|---|---|---|---|---|---|
| 15 | −20 | 2 | 0.2 | 1.402 | 24 | 5600 | 1.35 |
| 16 | +22 | 2 | 0.2 | 1.402 | 90 | 23200 | 1.48 |

EXAMPLE 7

Polymerization of MMA in THF in a batch system; initiator: EiB(Li)-PNP(Cl)

| experiment | T/° C. | [EiBLi-PNP]/10³ (mol/l) | [MMA]/ (mol/l) | reaction time (s) | monomer-conversion (%) | $M_n$ (exp) | $M_w/M_n$ |
|---|---|---|---|---|---|---|---|
| 17 | −25 | 2 | 0.2 | 30 | 100 | 13000 | 1.29 |

EXAMPLE 8

Polymerization of MMA in THF in a batch system; initiator: Trity(Li)-MPATPP(I)

| experiment | T/° C. | [EiBLi-MPATPP]/10³ (mol/l) | [MMA]/ (mol/l) | reaction time (s) | monomer-conversion (%) | $M_n$ (exp) | $M_w/M_n$ |
|---|---|---|---|---|---|---|---|
| 18 | −25 | 2 | 0.2 | 15 | 97.7 | 67300 | 1.96 |

COMPARATIVE EXAMPLE 9

Polymerization of MMA in THF in a batch system; initiator: EiB(Li)-TTPP(Cl)

| experiment | T/° C. | [EiBLi-TTPP]/10³ (mol/l) | [MMA]/ (mol/l) | reaction time (s) | monomer-conversion (%) | $M_n$ (exp) | $M_w/M_n$ |
|---|---|---|---|---|---|---|---|
| 19 | −25 | 2 | 0.2 | 15 | 97.6 | 21500 | 2.36 |

EXAMPLE 10

Polymerization of MMA in THF in a batch system; initiator: 2-Ethylhexanolate(K)-PNP(Cl)

| experiment | T/° C. | [Ethylhexanolat-PNP]/10³ (mol/l) | [MMA]/ (mol/l) | reaction time (s) | monomer-conversion (%) | $M_n$ (exp) | $M_w/M_n$ |
|---|---|---|---|---|---|---|---|
| 20 | −25 | 2 | 0.2 | 60 | 95.2 | 16900 | 1.49 |

Polymerization Experiments using 2-Ethylhexlacrylate (EHA)

EXAMPLE 11

Polymerization of EHA in THF in a Flow Tube Reactor at different temperatures; initiator: Trity(K)-PNP(Cl)

| experiment | T/° C. | [Trityl-PNP]/ 10³ (mol/l) | [EHA]/ (mol/l) | reaction time (s) | monomer conversion (%) | $M_n$ (exp) | $M_w/M_n$ |
|---|---|---|---|---|---|---|---|
| 1 | −22.1 | 2 | 0.2 | 0.978 | 32 | 3100 | 3.25 |
| 2 | −0.4 | 2 | 0.2 | 0.983 | 25 | 1900 | 2.38 |
| 3 | +20.6 | 2 | 0.2 | 0.983 | 19 | 1350 | 1.98 |

EXAMPLE 12

Polymerization of EHA in THF in a batch system; initiator: Trity(K)-PNP(Cl)

| experiment | T/° C. | [Trityl-PNP]/ 10³ (mol/l) | [EHA]/ (mol/l) | reaction time (s) | monomer conversion (%) | $M_n$ (exp) | $M_w/M_n$ |
|---|---|---|---|---|---|---|---|
| 4 | −25 | 2 | 0.2 | 34 | 95.3 | 2284 | 4.82 |

EXAMPLE 13

Polymerization of EHA in THF in a batch system; initiator: 2-Ethylhexanolate(K)-PNP(Cl)

| experiment | T/° C. | [Ethylhexanolate (K)-PNP]/ 10³ (mol/l) | [EHA]/ (mol/l) | reaction time (s) | monomer conversion (%) | $M_n$ (exp) | $M_w/M_n$ |
|---|---|---|---|---|---|---|---|
| 5 | −25 | 2 | 0.2 | 30 | 95.0 | 7800 | 2.80 |

Polymerization Experiments using n-Butylacrylate (nBuA)

EXAMPLE 14

Polymerization of nMuA in THF in a Flow Tube Reactor at different temperatures; initiator: Trity(K)-PNP(Cl)

| experiment | T/° C. | [Trityl-PNP]/ 10³ (mol/l) | [nBuA]/ (mol/l) | reaction time (s) | monomer conversion (%) | $M_n$ (exp) | $M_w/M_n$ |
|---|---|---|---|---|---|---|---|
| 1 | −18 | 2 | 0.2 | 0.978 | 27 | 1000 | 2.28 |
| 2 | −0.3 | 2 | 0.2 | 0.102 | 16 | 1000 | 1.98 |
| 3 | +20.8 | 2 | 0.2 | 0.102 | 12 | 700 | 1.38 |

What is claimed is:

1. A method for preparing a polymer, comprising the steps of:

polymerizing a monomer of the formula:

in the presence of an initiator of the formula $$n[(Ar)_xP(NR^6R^7)_{4-x}]^+Q^{n-} \quad (II)$$

and/or $$[(Ar)_xP(NR^6R^7)_{4-x}]^+(Q')^- \quad (III)$$

at a temperature of from −78° C. to +60° C., in the presence or absence of solvent, for a length of time sufficient to polymerize the monomer(s), wherein:

$R^1$ is selected from the group consisting of H, CN, CF$_3$, alkyl of from 1 to 6 carbon atoms and aryl, $R^2$ is selected from the group consisting of CN, C(=X)R$^3$, C(=X)NR$^4$R$^5$ and heterocyclic rings capable of stabilizing an α-anion, where X is NR (R is C$_1$–C$_{20}$ alkyl), O or S, R$^3$ is alkyl of from 1 to 20 carbon atoms, alkoxy of from 1 to 20 carbon atoms or alkylthio of from 1 to 20 carbon atoms, and R$^4$ and R$^5$ are independently alkyl of from 1 to 20 carbon atoms or are joined together to form an alkylene group of from 2 to 5 carbon atoms, thus forming a 3- to 6-membered ring;

R$^6$ and R$^7$ are either independently alkyl of from 1 to 20 carbon atoms, alkoxy from 1 to 20 carbon atoms or aryl or are joined together to form, together with the N-atom, a 3- to 6-membered N-heterocyclic ring, additionally R$^6$ and R$^7$ together may be =P(Ar)$_x$, Ar is aryl (as defined later on) and x is an integer from 1 to 3;

Q is CR$^8$R$^9$R$^{10}$, NR$^{11}$R$^{12}$, OR$^{13}$, SR$^{14}$ or R$^{15}$(CR$^8$R$^9$)$_p$(NR$^{11}$)$_q$(O)$_r$(S)$_s$ wherein p, q, r and s are independently an integer of from 0 to 30 and where the sum of p to s is at least 2;

Q' is R$^{16}$—CR$^8$R$^9$R$^{10}$, R$^{16}$—NR$^{11}$R$^{12}$, R$^{16}$—OR$^{13}$, R$^{16}$—SR$^{14}$, R$^{16}$—Z;

R$^8$ and R$^9$ are independently alkyl of from 1 to 20 carbon atoms, aryl, CN, C(=X)R$^3$ as defined above and C(=X)NR$^4$R$^5$ as defined above, and R$^8$ and R$^9$ are joined together to form a ring, and R$^{10}$ is H, alkyl of from 1 to 20 carbon atoms, aryl or a polymer radical;

R$^{11}$ and R$^{12}$ are independently alkyl of from 1 to 20 carbon atoms, aryl, C$_7$- to C$_{20}$-aralkyl, C$_3$- to C$_{30}$-organosilyl, C(=X)R$^3$ as defined above, or R$^{11}$ and R$^{12}$ are joined together to form a heterocycle, R$^{13}$ and R$^{14}$ are independently alkyl of from 1 to 20 carbon atoms, cycloalkyl of from 3 to 10 carbon atoms or aryl, R$^{15}$ is an organic radical of value p+q+r+s;

R$^{16}$ is a polymer radical;

Z is a radical derived from an initiator for the anionic polymerization of anionic polymerizable monomers other than radicals derived from compounds II or III;

n is an integer of from 1 to 30;

Ar is aryl and refers to a single aromatic ring or a fused aromatic ring system preferably with two nuclei;

quenching the reaction mixture with an acyl halide, an acid anhydride or a substance containing an active hydrogen atom, to form a polymer; and isolating the formed polymer.

2. The method of claim 1, wherein $R^6$, $R^7$ are independently alkyl of from 1 to 5 carbon atoms or phenyl, naphthyl, phenyl having from 1 to 5 substituents or naphthyl having from 1 to 7 substituents, each of said substituents being independently selected from the group consisting of alkyl of from 1 to 20 carbon atoms, alkyl of from 1 to 6 carbon atoms in which each of the hydrogen atoms may be independently replaced by a halogen atom, alkenyl of from 2 to 20 carbon atoms, alkynyl of from 2 to 20 carbon atoms, alkoxy of from 1 to 6 carbon atoms, alkylthio of from 1 to 6 carbon atoms, phenyl, halogen, $C_1$–$C_6$-dialkylamino, or $R^6$ and $R^7$ together may be =P(Ar)$_x$.

3. The method of claim 2, wherein $R^6$ and $R^7$ are independently methyl, ethyl or isopropyl or phenyl, phenyl substituted from 1 to 5 times with fluorine or chlorine, or phenyl substituted from 1 to 3 times with a substituent selected from the group consisting of alkyl of from 1 to 4 carbon atoms, alkoxy of from 1 to 4 carbon or $R^6$ and $R^7$ together are =P(Ar)$_x$.

4. The method of claim 1, wherein said reacting is conducted at a temperature of from −20° C. to +40° C.

5. The method of claim 4, wherein said reacting is conducted at a temperature of from 0° C. to +30° C.

6. The method of claim 1, wherein said quenching is conducted with water or an alcohol of from 1 to 6 carbon atoms.

7. The method of claim 1, wherein said quenching is conducted with a mixture of methanol and acetic acid.

8. The method of claim 1, wherein said initiator has the formula wherein:

$R^8$ and $R^9$ are independently alkyl of from 1 to 20 carbon atoms, CN, C(=X)R$^3$, C(=X)NR$^4$R$^5$, R$^3$ being alkyl of from 1 to 20 carbon atoms, alkoxy of from 1 to 20 carbon atoms or, alkylthio of from 1 to 20 carbon atoms, $R^4$ and $R^5$ being independently alkyl of from 1 to 20 carbon atoms or being joined together to form an alkylene group of from 2 to 5 carbon atoms thus forming a 3- to 6-membered ring and X is NR (R is $C_{1-20}$ alkyl), O or S, or $R^8$ and $R^9$ are phenyl, naphthyl, phenyl having from 1 to 5 substituents or naphthyl having from 1 to 7 substituents; and each of said substituents being independently selected from the group consisting of alkyl of from 1 to 20 carbon atoms, alkyl of from 1 to 6 carbon atoms in which each of the hydrogen atoms may be independently replaced by a halogen atom, alkenyl of from 2 to 20 carbon atoms, alkynyl of from 2 to 20 carbon atoms, alkoxy of from 1 to 6 carbon atoms, alkylthio of from 1 to 6 carbon atoms, phenyl, halogen, $C_1$–$C_6$-dialkylamino, phenyl substituted with from 1 to 5 halogen atoms and phenyl substituted with from 1 to 5 alkyl groups of from 1 to 4 carbon atoms or $R^8$ and $R^9$ are joined together to form a ring; and $R^{10}$ is H, alkyl of from 1 to 20 carbon atoms, phenyl, naphthyl, phenyl having from 1 to 5 substituents or naphthyl having from 1 to 7 substituents; each of said substituents being independently selected from the group consisting of alkyl of from 1 to 20 carbon atoms, alkyl of from 1 to 6 carbon atoms in which each of the hydrogen atoms may be independently replaced by a halogen atom, alkenyl of from 2 to 20 carbon atoms, alkynyl of from 2 to 20 carbon atoms, alkoxy of from 1 to 6 carbon atoms, alkylthio of from 1 to 6 carbon atoms, phenyl, halogen, $C_1$–$C_6$-dialkylamino, phenyl substituted with from 1 to 5 halogen atoms and phenyl substituted with from 1 to 5 alkyl groups of from 1 to 4 carbon atoms or a polymer radical;

$R^{11}$ and $R^{12}$ are independently alkyl of from 1 to 10 carbon atoms, $C_6$- to $C_{18}$-aryl, $C_7$–$C_{15}$-aralkyl, $C_3$- to $C_{18}$-organosilyl in which the tetravalent silicon atom is preferably substituted with radicals selected from the group consisting of alkyl having from 1 to 20 carbon atoms, aryl having from 6 to 18 carbon atoms, aralkyl being formed from a $C_1$- to $C_6$-alkylene moiety, and a $C_6$- to $C_{18}$-aryl moiety, C(O)R$^3$ (R$^3$ as defined above) or $R^{11}$ and $R^{12}$ may be joined together to form a heterocycle;

$R^{13}$ and $R^{14}$ are independently alkyl of from 1 to 10 carbon atoms, cycloalkyl of from 3 to 10 carbon atoms, $C_6$- to $C_{18}$-aryl;

$R^{15}$ is an alkylene of from 1 to 20 carbon atoms, or $C_6$- to $C_{18}$-arylene of the value n, and n is an integer of from 1 to 30.

9. The method of claim 8, wherein $R^8$ and $R^9$ are independently phenyl or phenyl having from 1 to 3 substituents selected from the group consisting of alkyl of from 1 to 6 carbon atoms, alkoxy of from 1 to 4 carbon atoms, phenyl and halogen; and $R^{10}$ is independently H, alkyl of from 1 to 6 carbon atoms, phenyl, or phenyl having from 1 to 3 substituents selected from the group consisting of alkyl of from 1 to 6 carbon atoms, alkoxy of from 1 to 4 carbon atoms, phenyl and halogen or a polymer radical;

$R^{11}$ and $R^{12}$ are independently methyl, ethyl, i-propyl or cyclohexyl, $C_6$- to $C_{10}$-aryl, such as phenyl or naphthyl, preferably phenyl, or $R^{11}$ and $R^{12}$ are benzyl, $C_3$- to $C_{18}$-organosilyl in which the tetravalent silicon atom is substituted with radicals selected from the group consisting of methyl, ethyl, i-propyl, n-butyl, t-butyl or cyclohexyl, phenyl, and aralkyl, a $C_1$–to $C_3$-alkylene moiety, and a $C_6$- to $C_{10}$-aryl moiety, such as benzyl, or $R^{11}$ and $R^{12}$ are C(O)R$^3$, R$^3$ being selected from the group consisting of methyl, ethyl, n-propyl, i-propyl, t-butyl or cyclohexyl, alkyl of from 1 to 10 carbon atoms having as substituents fluorine or chlorine, phenyl or naphthyl, and O-methyl, O-ethyl, O-n-propyl, O-i-propyl, O-t-butyl or O-cyclohexyl; or $R^{11}$ and $R^{12}$ may be joined together to form 2-pyrrolidone, 3,4-dihydropyrrol-2,5-dione or phthalimide;

$R^{13}$ and $R^{14}$ are independently methyl, ethyl, n-propyl, i-propyl, t-butyl or cyclohexyl, phenyl or naphthyl;

$R^{15}$ is ethylene, 1,2-propylene 1,3-propylene, 1,4-butylene or 1,6-hexylene, cycloalkylene, or o-, m-, p-phenylene.

10. The method of claim 1, wherein said initiator has the formula:

wherein $R^6$ and $R^7$ are either independently alkyl of from 1 to 20 carbon atoms, alkoxy from 1 to 20 carbon atoms or aryl or are joined together to form, together with the N-atom, a 3- to 6-membered N-heterocyclic ring, additionally $R^6$ and $R^7$ together may be =P(Ar)$_x$, Ar is aryl and refers to a single aromatic ring or a fused aromatic ring system preferably with two nuclei, and x is an integer from 1 to 3.

11. The method of claim 10, wherein said polymer radical is of one or more monomers selected from the group consisting of styrene, (α-methylstyrene, styrene having 1 to 5 substituents on the phenyl ring, α-methylstyrene having 1 to 5 substituents on the phenyl ring, butadiene, isoprene, dimethylbutadiene, and mixtures thereof; said substituents being selected from the group consisting of $C_1$–$C_4$-alkyl and $C_1$–$C_4$-alkoxy.

12. The method of claim 1 wherein said monomer is a (meth)acrylate ester of a $C_1$–$C_{20}$ alcohol, such as methyl acrylate, n-butyl acrylate, t-butyl acrylate, ethyl acrylate, 2-ethylhexylacrylate, methyl methacrylate, ethyl methacrylate or 2-ethylhexyl methacrylate, n-butyl methacrylate, t-butyl methacrylate, lauryl methacrylate, allyl methacrylate, dicyclopentadienyl methacrylate or acrylonitrile, a cyanoacrylate ester of a $C_1$–$C_{20}$ alcohol, a vinyl heterocycle having about 5 to 6 ring members and containing from 1 to 3 heteroatoms, selected from N, O, and S and including heterocyclic rings selected from the group consisting of 2-vinyl pyridine, 6-vinyl pyridine, 2-vinyl pyrrole, 5-vinyl pyrrole, 2-vinyl oxazole, 5-vinyl oxazole, 2-vinyl thiazole, 5-vinyl thiazole, 2-vinyl imidazole, 5-vinyl imidazole, 3-vinyl pyrazole, 5-vinyl pyrazole, 3-vinyl pyridazine, 6-vinyl pyridazine, 3-vinyl isoxazole, 3-vinyl isothiazoles, 2-vinyl pyrimidine, 4-vinyl pyrimidine, 6-vinyl pyrimidine, and vinyl pyrazine; wherein said vinyl heterocycle may bear one or more $C_1$–$C_6$ alkyl or alkoxy groups, cyano groups, $C_1$–$C_6$ ester groups or halogen atoms, and said vinyl heterocycles which, when unsubstituted, contain an N—H group are protected with a conventional blocking or protecting group.

13. The method of claim 12, wherein said monomer is methyl methacrylate.

14. A method for preparing a triblock polymer, comprising the steps of: reacting a first monomer of the formula:

with an initiator of the formula at a temperature of from −78° C. to +60° C., in the presence or absence of solvent, for a length of time sufficient to polymerize the first monomer, wherein:

$R^1$ is selected from the group consisting of H, CN, $CF_3$, alkyl of from 1 to 6 carbon atoms and aryl, $R^2$ is independently selected from the group consisting of CN, C(=X)$R^3$, C(=X)$NR^4R^5$ and heterocyclic rings capable of stabilizing an α-anion, where X is NR (R is $C_1$–$C_{20}$ alkyl), O or S, $R^3$ is alkyl of from 1 to 20 carbon atoms, alkoxy of from 1 to 20 carbon atoms or alkylthio of from 1 to 20 carbon atoms, and $R^4$ and $R^5$ are independently alkyl of from 1 to 20 carbon atoms or are joined together to form an alkylene group of from 2 to 5 carbon atoms, thus forming a 3- to 6-membered ring;

$R^6$ and $R^7$ are either independently alkyl of from 1 to 20 carbon atoms, alkoxy from 1 to 20 carbon atoms or aryl or are joined together to form, together with the N-atom, a 3- to 6-membered N-heterocyclic ring, additionally $R^6$ and $R^7$ together may be =P(Ar)$_x$ and x is an integer from 1 to 3;

wherein p, q, r and s are independently an integer of from 0 to 30 and where the sum of p to s is at least 2;

$R^8$ and $R^9$ are independently alkyl of from 1 to 20 carbon atoms, aryl, CN, C(=X)$R^3$ as defined above and C(=X)$NR^4R^5$ as defined above, and $R^8$ and $R^9$ are joined together to form a ring, and $R^{13}$ is an alkyl of from 1 to 20 carbon atoms, cycloalkyl of from 3 to 10 carbon atoms or aryl, $R^{15}$ is an organic radical of value p+q+r+s;

Ar refers to a single aromatic ring or a fused aromatic ring system with two nuclei;

adding a second monomer of the formula:

where $R^1$ and $R^2$ are as defined above, said second monomer being distinct from said first monomer, at said temperature and reacting for a length of time sufficient to form a triblock polymer intermediate, quenching the triblock polymer intermediate with an acyl halide, an acid anhydride or a substance containing an active hydrogen atom to form a triblock polymer; and isolating the formed triblock polymer.

15. A method for preparing a block polymer, comprising the steps of:

anionically polymerizing one or more first monomers to form a polymer anion;

reacting said polymer anion with a 1,1-diarylethylene to form a polymer-diarylmethyl anion;

metathesizing said polymer-diarylmethyl anion with a phosphonium halide salt of the formula:

where Y is an inorganic anion, and $R^6$ and $R^7$ are either independently alkyl of from 1 to 20 carbon atoms, alkoxy from 1 to 20 carbon atoms or aryl or are joined together to form, together with the N-atom, a 3- to 6-membered N-heterocyclic ring, additionally $R^6$ and $R^7$ together may be =P(Ar)$_x$; Ar is aryl and refers to a single aromatic ring or a fused aromatic ring system preferably with two nuclei; and x is an integer from 1 to 3, to provide an initiator; reacting said initiator with one or more monomers of the formula:

at a temperature of from −78° C. to +60° C., in the presence or absence of solvent, for a length of time sufficient to polymerize the first monomer, wherein $R^1$ is selected from the group consisting of H, CN, $CF_3$, alkyl of from 1 to 6 carbon atoms and aryl, and $R^2$ is selected from the group consisting of CN, C(=X)$R^3$, C(=X)$NR^4R^5$ and heterocyclic rings capable of stabilizing an α-anion, where X is NR (R is $C_1$–$C_{20}$ alkyl), O or S, $R^3$ is alkyl of from 1 to 20 carbon atoms, alkoxy of from 1 to 20 carbon atoms or alkylthio of from 1 to 20 carbon atoms, and $R^4$ and $R^5$ are independently alkyl of from 1 to 20 carbon atoms or are joined together to form an alkylene group of from 2 to 5 carbon atoms, thus forming a 3- to 6-membered ring, to form a reaction mixture;

quenching the reaction mixture with an acyl halide, an acid anhydride or a substance containing an active hydrogen atom to form a block polymer; and isolating the formed block polymer.

16. The method of claim 15, where said anionically polymerizing comprises reacting said first monomer(s) with a $C_1$–$C_4$-alkyllithium reagent.

17. The method of claim 15, wherein $Y^-$ is selected from the group consisting of a halide, nitrate, nitrite, borate, trifluoromethanesulfonate, $(SO_4)_{0.5}$, $(PO_4)_{0.33}$ and $(CO_3)_{0.5}$.

* * * * *